United States Patent
Matsui et al.

(10) Patent No.: US 9,571,600 B2
(45) Date of Patent: Feb. 14, 2017

(54) RELAY DEVICE, RELAY METHOD AND THIN CLIENT SYSTEM

(71) Applicant: FUJITSU LIMITED, Kawasaki-shi, Kanagawa (JP)

(72) Inventors: Kazuki Matsui, Kawasaki (JP); Kenichi Horio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 14/303,922

(22) Filed: Jun. 13, 2014

(65) Prior Publication Data
US 2015/0081770 A1 Mar. 19, 2015

(30) Foreign Application Priority Data
Sep. 19, 2013 (JP) .................. 2013-194665

(51) Int. Cl.
*H04L 29/08* (2006.01)
*G06F 17/30* (2006.01)
*H04W 4/18* (2009.01)

(52) U.S. Cl.
CPC ..... *H04L 67/2828* (2013.01); *G06F 17/30905* (2013.01); *H04L 67/04* (2013.01); *H04L 67/2823* (2013.01); *G06F 17/30899* (2013.01); *G06F 17/30902* (2013.01); *H04W 4/18* (2013.01)

(58) Field of Classification Search
CPC ...... H04L 67/04; H04L 67/28; H04L 67/2823; H04L 67/2828; H04L 67/2842; H04L 67/2847; H04L 67/02; H04W 4/18; G06F 17/211; G06F 17/217; G06F 17/30899; G06F 17/30902; G06F 17/30905

USPC ........ 709/203, 217, 219, 230, 246; 715/234, 715/249, 251, 781, 784, 864; 707/E17.119, 707/E17.12, E17.121
See application file for complete search history.

(56) References Cited

U.S. PATENT DOCUMENTS

| | | | |
|---|---|---|---|
| 6,243,761 B1 * | 6/2001 | Mogul | H04L 67/2823 709/217 |
| 6,563,517 B1 * | 5/2003 | Bhagwat | G06F 17/30905 375/E7.198 |
| 6,704,024 B2 * | 3/2004 | Robotham | G06F 17/30905 709/203 |
| 6,763,248 B1 * | 7/2004 | Odamura | H04L 67/2842 709/217 |

(Continued)

FOREIGN PATENT DOCUMENTS

| | | |
|---|---|---|
| JP | 6-214533 | 8/1994 |
| JP | 2004-349965 | 12/2004 |

(Continued)

*Primary Examiner* — Vivek Srivastava
*Assistant Examiner* — William C McBeth
(74) *Attorney, Agent, or Firm* — Staas & Halsey LLP (57) ABSTRACT

A relay device includes: a processor; and a memory which stores a plurality of instructions, which when executed by the processor, cause the processor to execute, receiving a page from a server device; partitioning a second region other than a first region of the page in which the page is displayed by a client terminal into one or more partition regions; calculating the number of partition regions transmitted to the client terminal during a time difference between an acquisition time taken to acquire the entire page from the server device and a transmission time taken to transmit the first region to the client terminal; and transmitting an image corresponding to the first region and images corresponding to the partition regions of the calculated number to the client terminal.

9 Claims, 6 Drawing Sheets (56) References Cited

U.S. PATENT DOCUMENTS

| | | | |
|---|---|---|---|
| 7,289,244 B2* | 10/2007 | Tuli | H04L 67/2828 707/E17.119 |
| 7,711,854 B2* | 5/2010 | Ecklund | H04L 67/2823 709/238 |
| 2005/0041858 A1* | 2/2005 | Celi | G06F 17/30905 382/173 |
| 2007/0118640 A1* | 5/2007 | Subramanian | G06F 17/2247 709/224 |
| 2008/0222273 A1* | 9/2008 | Lakshmanan | G06F 17/30905 709/219 |
| 2009/0106687 A1* | 4/2009 | De Souza Sana | G06F 17/30902 715/784 |
| 2010/0095021 A1* | 4/2010 | Samuels | H04L 47/822 709/235 |
| 2011/0016403 A1* | 1/2011 | Shibukawa | G06F 17/30905 715/738 |
| 2011/0083082 A1* | 4/2011 | Gottwald | G06F 17/30899 715/744 |
| 2011/0126113 A1* | 5/2011 | Sharma | G06F 17/30905 715/738 |
| 2012/0192080 A1* | 7/2012 | Lloyd | G06F 17/30905 715/744 |
| 2012/0250598 A1* | 10/2012 | Lonnfors | H04L 67/2823 370/311 |
| 2012/0259974 A1* | 10/2012 | Gupta | G06F 17/30902 709/224 |
| 2013/0103738 A1* | 4/2013 | Evans | H04L 29/08072 709/203 |
| 2013/0275878 A1* | 10/2013 | Ruan | G06F 17/30902 715/738 |
| 2014/0281918 A1* | 9/2014 | Wei | H04L 67/28 715/234 |
| 2015/0019953 A1* | 1/2015 | Freiman | G06F 17/2247 715/234 |
| 2015/0296054 A1* | 10/2015 | Ozawa | H04N 21/2402 709/217 |

FOREIGN PATENT DOCUMENTS

| | | | | |
|---|---|---|---|---|
| JP | 2008-40529 | | 2/2008 | |
| JP | 2010-257148 A | * | 11/2010 | G06F 13/00 |

* cited by examiner

RELAY DEVICE, RELAY METHOD AND THIN CLIENT SYSTEM

CROSS-REFERENCE TO RELATED APPLICATION

This application is based upon and claims the benefit of priority of the prior Japanese Patent Application No. 2013-194665, filed on Sep. 19, 2013, the entire contents of which are incorporated herein by reference.

FIELD

The embodiments discussed herein are related to a relay device, a thin client system, a relay method, and a relay program.

BACKGROUND

A system called a thin client is known. In the thin client system, the system is configured such that a client terminal only has minimal functions to manage a resource such as an application, a file, or the like in a server.

The thin client system functions as if the client terminal performs processes as a main body, or stores data, while actually displaying the processing result performed by the server or the data stored in the server on the client terminal.

As described above, when screen data which is displayed on the client terminal is transmitted between the server and the client terminal, a screen update is generated according to operations. When the screen update is generated in the thin client system, differential screen data with respect to before and after the screen update is transmitted to the client terminal from the server. Here, for example, when a Web page is displayed in a Web browser, and when the Web page is vertically long, only a portion of the Web page is displayed on a display region of the Web browser. At this time, when operational information for scrolling the Web page is transmitted to the server from the client terminal, the differential screen data according to a scroll amount is transmitted with respect to the remaining portion of the Web page.

For example, at the time of displaying the Web page by the Web browser, when the display size of the Web page exceeds the screen size of the client terminal, the Web page may be displayed on the screen by narrowing the size to a portion of the Web page. At this time, when the remaining portion which is not displayed on the screen is browsed, after the scrolling operation which is received by the client terminal is notified to the server, the update screen after the scrolling is transmitted to the client terminal from the server as a difference. The thin client system of the related art is, for example, disclosed in Japanese Laid-open Patent Publication No. 6-214533, Japanese Laid-open Patent Publication No. 2004-349965, and Japanese Laid-open Patent Publication No. 2008-40529.

SUMMARY

In accordance with an aspect of the embodiments, a relay device includes: a processor; and a memory which stores a plurality of instructions, which when executed by the processor, cause the processor to execute, receiving a page from a server device; partitioning a second region other than a first region of the page in which the page is displayed by a client terminal into one or more partition regions; calculating the number of partition regions transmitted to the client terminal during a time difference between an acquisition time taken to acquire the entire page from the server device and a transmission time taken to transmit the first region to the client terminal; and transmitting an image corresponding to the first region and images corresponding to the partition regions of the calculated number to the client terminal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, a description of embodiments of a relay device, a thin client system, a relay method, and a relay program disclosed in this embodiment will be provided based on the drawings. Furthermore, the disclosed technology is not limited to the embodiments. In addition, the embodiments described below may be suitably combined to the extent having consistency.

(Embodiment 1)
(System Configuration)

Figure 1:
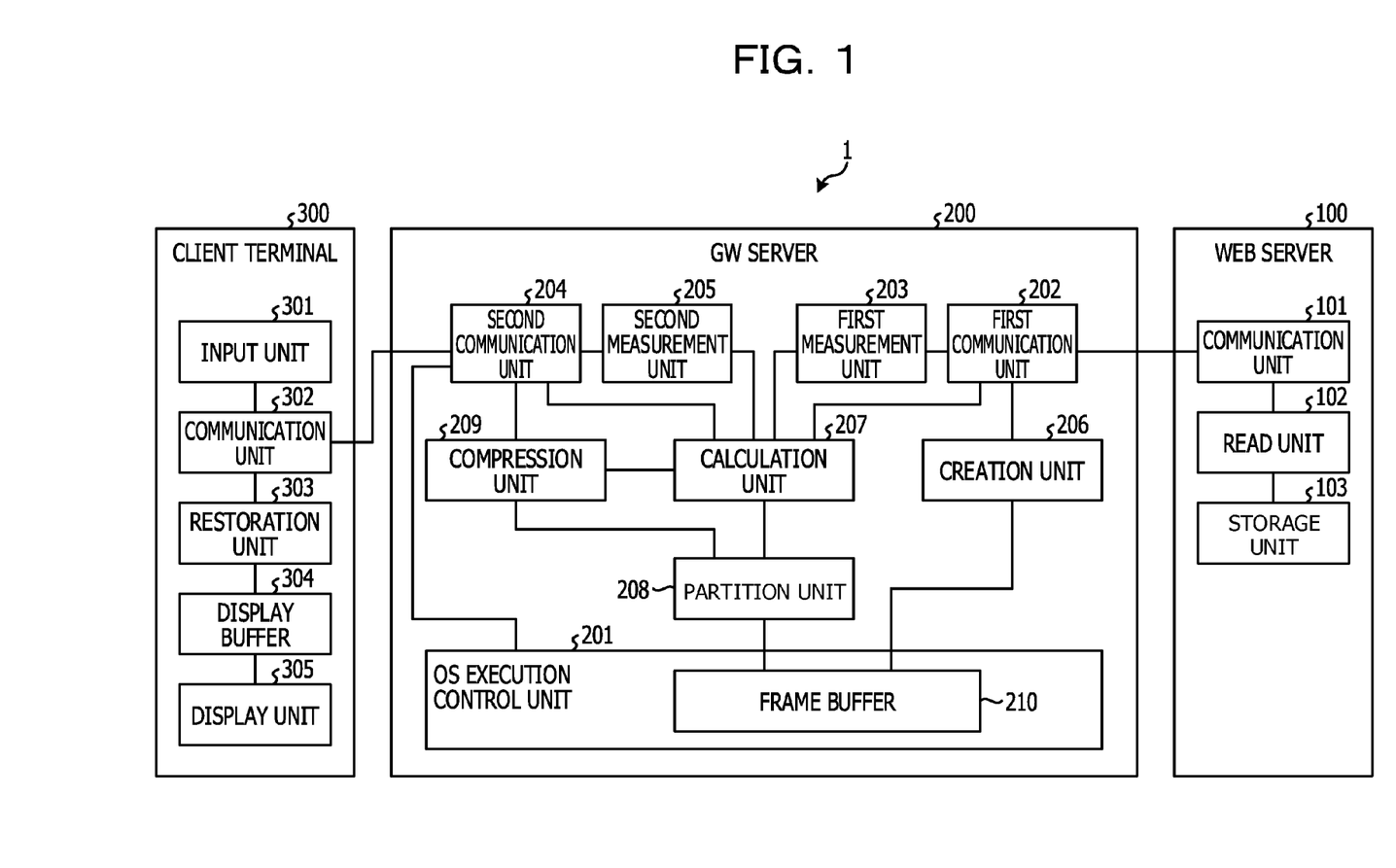
FIG. 1 is a block diagram illustrating an example of a configuration of a thin client system according to an embodiment.

First, a configuration of a thin client system according to this embodiment will be described. FIG. 1 is a block diagram illustrating an example of a configuration of a thin client system according to an embodiment. The thin client system 1 illustrated in FIG. 1, causes a Gate Way (GW) server 200 which is a relay device to remotely control a screen displayed by a client terminal 300. That is, the thin client system 1 functions as if the client terminal 300 performs processes as a main body, or stores data, while actually displaying the processing result performed by the GW server 200 or the data stored in the GW server 200 on the client terminal 300.

The thin client system 1 illustrated in FIG. 1 includes, a Web server 100 which is a server device, the GW server 200 which is a relay device, and the client terminal 300. Furthermore, in the example of FIG. 1, a case of connecting one Web server 100 and one client terminal 300 with respect to one GW server 200 is illustrated, but it is possible to connect an arbitrary number of Web servers and client terminals.

This Web server 100, GW server 200 and client terminal 300 are connected so as to be communicable with each other through a predetermined network. As the network, it is possible to adopt any kind of communication network such as the Internet, a Local Area Network (LAN), a Virtual Private Network (VPN), or the like, regardless of a wired or a wireless manner. Furthermore, it is assumed that a Remote Frame Buffer (RFB) protocol of VNC is adopted as an example of a communication protocol between the GW server 200 and the client terminal 300.

The Web server 100 is a server device distributing content, and distributes a Web page as content. The Web server 100 transmits a corresponding Web page to the GW server 200, according to a page request from the GW server 200. Furthermore, in the description below, the Web page may be simply referred to as a page.

The GW server 200 is a computer which provides a service to remotely control the screen displayed on the client terminal 300. In the GW server 200, an application for remote screen control for a server is installed or preinstalled. Furthermore, hereinafter, the application for remote screen control for a server may be referred to as an app for remote screen control on a server side.

The app for remote screen control on a server side has a function of providing a remote screen control service, as a basic function. As one aspect, the app for remote screen control on a server side acquires operational information of the client terminal 300, and causes the application, which is performed by the device itself, to execute a process requested by the operation. The app for remote screen control on a server side creates a screen for displaying the processing result performed by the application, and transmits the screen to the client terminal 300. At this time, the app for remote screen control on a server side transmits a region in which the pixels of the changed portions between bit map images displayed by the client terminal 300 are collected, that is, an updated rectangular image before a screen of the current time is created. Furthermore, the image of the updated portion is not limited to the rectangular image, and may have a shape other than a rectangular shape.

In addition, the app for remote screen control on a server side also has a function of compressing the data of a portion for which there is a large amount of movement between the frames into data in a compression scheme for moving pictures and transmitting the compressed data to the client terminal 300. As one aspect, the app for remote screen control on a server side partitions the screen created from the processing result performed by the application into a plurality of regions, and monitors the changing frequency for each of the partitioned regions. At this time, the app for remote screen control on a server side transmits attribute information of the region in which the changing frequency exceeds a threshold value, that is, a high changing frequency region to the client terminal 300. In addition, the app for remote screen control on a server side encodes the bit map image of the high changing frequency region into data in an MPEG scheme such as MPEG-2, MPEG-4, or the like, and transmits the encoded data to the client terminal 300. Furthermore, here, although a case in which the data is compressed into data in the Moving Picture Experts Group (MPEG) scheme is illustrated, the embodiment is not limited thereto. For example, it is possible to adopt any compression encoding scheme, for example, Motion-Joint Photographic Experts Group (JPEG) or the like insofar as it is a compression scheme for moving pictures.

The GW server 200 may execute, for example, the Web browser which is able to scroll the screen as the application. When receiving a page from the Web server 100, the Web browser creates an image corresponding to the page according to an HTML or the like of the page. Here, the page may have a region outside of a display screen which appears in the display screen by scrolling in the window of the Web browser. At this time, a region displayed in the display screen at the initial stage of reading the page is set as a first region, and a region of the page outside of the display screen is set as a second region. Here, in the thin client system 1, a difference is generated between a time for the GW server 200 to receive the entire page from the Web server 100, and a time for the GW server 200 to transmit the first region to the client terminal 300. It is possible for the GW server 200 to improve the response with respect to the scrolling of a user, that is, the operability, by partitioning the image of the second region and transmitting a portion of the partitioned image to the client terminal 300 during the time difference. Here, the GW server 200 gathers statistics, for example, about the number of times a single flicking operation is performed on a touch panel by the user, with respect to the partitioning of the second region, and determines the scroll amount in advance, based on, for example, the most frequent value of the statistics. It is possible for the GW server 200 to partition the second region into one or more partition regions, based on the determined scroll amount.

The client terminal 300 is a computer on a side in which a remote screen control service is provided by the GW server 200. As an example of the client terminal 300, it is possible to adopt a tablet terminal, a smartphone, or the like. In addition, as another example of the client terminal 300, it is possible to adopt a fixed terminal such as a personal computer or the like, in addition to a mobile terminal such as a mobile phone, a Personal Handyphone System (PHS), a Personal Digital Assistant (PDA), or the like. In the client terminal 300, an application for remote screen control for a client is installed or preinstalled. Furthermore, hereinafter, the application for remote screen control for a client may be referred to as an app for remote screen control on a client side.

The app for remote screen control on a client side has a function of notifying the GW server 200 of the operational information received through various input devices such as a touch panel, a mouse, a keyboard, and the like. As one aspect, the app for remote screen control on a client side notifies the GW server 200 of the number of times tapping or flicking is performed on the touch panel integrated with a display unit, or the like as the operational information. As another example, the app for remote screen control on a client side notifies the GW server 200 of the movement amount of a mouse cursor obtained through left and right clicking of the mouse, double clicking, dragging or a movement operation of the mouse, as the operational information. As yet another example, the app for remote screen control on a client side also notifies the GW server 200 of the rotation amount of a mouse wheel, the identity of the pressed key on the keyboard, or the like, as the operational information.

Further, the app for remote screen control on a client side has a function of displaying the image received from the GW server 200 on a predetermined display unit. As one aspect, when receiving the updated rectangular bit map image from the GW server 200, the app for remote screen control on a client side displays the updated rectangular image in conformity to a position in which a change is generated from the bit map image of the previous time. As another aspect, when receiving the attribute information of the high changing frequency region from the GW server 200, the app for remote screen control on a client side sets a region on the display screen corresponding to a position included in the attribute information as a blank region outside of the bit map image display target. In addition, when receiving the data in the compression scheme for moving pictures, the app for remote screen control on a client side displays the data in the blank region after having decoded the data.

In addition, when receiving the partition regions into which the second region is partitioned, the client terminal 300 stores the partition regions in a display buffer. When supplied with a flicking operation by the user, the client terminal 300 displays the partition regions stored in the display buffer according to the scroll amount of the flicking operation.

(Configuration of Web Server)

Next, a functional configuration of the Web server according to this embodiment will be described. As illustrated in FIG. 1, the Web server 100 includes a communication unit 101, a read unit 102, and a storage unit 103. Furthermore, in the example of FIG. 1, it is assumed that various functional units of the well-known computer, for example, units having functions of various input devices, display devices, or the like are included, in addition to the functional units illustrated in FIG. 1.

The communication unit 101 is realized, for example, by a Network Interface Card (NIC) or the like. The communication unit 101 is connected to the GW server 200 through a network in a wired or a wireless manner, and is a communication interface controlling the communication of information between the GW server 200 and the communication unit 101. The communication unit 101 receives a page request from the GW server 200, and outputs the received page request to the read unit 102. In addition, the communication unit 101 transmits the page input from the read unit 102 to the GW server 200.

When supplied with the page request from the communication unit 101, the read unit 102 reads out a corresponding page from the storage unit 103. When supplied with, for example, a predetermined Uniform Resource Locator (URL) as the page request, the read unit 102 reads out a page corresponding to the predetermined URL from the storage unit 103. The read unit 102 outputs the read page to the communication unit 101.

The storage unit 103 stores the page. The page is described in, for example, a Hyper Text Markup Language (HTML) or the like, and includes images or the like. In addition, the page may be a dynamic page using a Java (registered trademark) applet, Java (registered trademark) EE (Java Platform, Enterprise Edition), Flash (registered trademark), Ajax, or the like. In addition, the page may also include a still image such as a JPEG image or the like, and a dynamic image such as an MPEG-2 image, an MPEG-4 image, or the like.

(Configuration of GW Server)

Next, a functional configuration of the GW server according to this embodiment will be described. As illustrated in FIG. 1, the GW server 200 includes an OS execution control unit 201, a first communication unit 202, a first measurement unit 203, a second communication unit 204, a second measurement unit 205, a creation unit 206, a calculation unit 207, a partition unit 208, and a compression unit 209. In addition, the OS execution control unit 201 includes a frame buffer 210. Furthermore, in the example of FIG. 1, it is assumed that various functional units of the well-known computer, for example, units having functions of various input devices, display devices, or the like are included, in addition to the functional units illustrated in FIG. 1.

The OS execution control unit 201 is a processing unit which controls the execution of an Operating System (OS). As one aspect, The OS execution control unit 201 detects a start-up instruction of the application or a command with respect to the application from the operational information which is acquired through the second communication unit 204. For example, upon detecting tapping on an icon of an application, the OS execution control unit 201 starts up the application corresponding to the icon. In addition, upon detecting an operation of requesting the execution of a command on an operation screen, namely, a so-called window of the application during the start-up phase, the OS execution control unit 201 instructs the application to execute the command. Furthermore, hereinafter, the application may be referred to as an app. In addition, the OS execution control unit 201 includes the frame buffer 210 which stores images of the remote screen and the screens of the respective applications, and controls the entire remote screen.

The first communication unit 202 is realized, for example, by an NIC or the like. The first communication unit 202 is connected to the Web server 100 through a network in a wired or a wireless manner, and is a communication interface controlling the communication of information between the Web server 100 and the first communication unit 202. The first communication unit 202 transmits a page request to the Web server 100. In addition, the first communication unit 202 receives the page from the Web server 100. Furthermore, in the received page, the information about the data amount of the entire page is included. The first communication unit 202 outputs the page to the creation unit 206, and outputs the data amount of the entire page to the calculation unit 207.

The first measurement unit 203 measures the communication of the first communication unit 202. The first measurement unit 203 measures, for example, the communication data amount between the first communication unit 202 and the communication unit 101 of the Web server 100 every second, and measures an available bandwidth which is a usable bandwidth between the first communication unit 202 and the communication unit 101. The first measurement unit 203 outputs the measured available bandwidth to the calculation unit 207 as a first available bandwidth.

The second communication unit 204 is realized, for example, by an NIC or the like. The second communication unit 204 is connected to the client terminal 300 through a network in a wired or a wireless manner, and is a communication interface controlling the communication of information between the client terminal 300 and the second communication unit 204. The second communication unit 204 receives the operational information from the client terminal 300, and outputs the operational information to the OS execution control unit 201 and the calculation unit 207. In addition, when supplied with compressed data which is compressed differential image data from the compression unit 209, the second communication unit 204 transmits the compressed data to the client terminal 300.

The second measurement unit 205 measures the communication of the second communication unit 204. The second measurement unit 205 measures, for example, the communication data amount between the second communication unit 204 and a communication unit 302 (described later) of the client terminal 300 every second, and measures an available bandwidth which is a usable bandwidth between the second communication unit 204 and the communication unit 302. The second measurement unit 205 outputs the measured available bandwidth to the calculation unit 207 as a second available bandwidth.

Based on a page input from the first communication unit 202, the creation unit 206 creates an image in order to display the page on the display screen. The creation unit 206, for example, has a function of the Web browser as the application, and creates an image corresponding to the page according to the HTML or the like of the page. Here, the page is not limited to a page which is able to be entirely displayed in the display screen of the Web browser, but may have a region which appears in the display screen by scrolling in the window of the Web browser. At this time, in the page, a region in which the page is displayed by the client terminal is set as a first region, and a region other than the first region is set as a second region. That is, the region which appears in the display screen by scrolling in the window of the Web browser is set as the second region. The creation unit 206 creates an image of the first region and the second region, that is, an image corresponding to the entire page, and draws and stores the image in the frame buffer 210.

The data amount of the entire page is input into the calculation unit 207 from the first communication unit 202, and the first available bandwidth is input into the calculation unit 207 from the first measurement unit 203. In addition, the second available bandwidth is input into the calculation unit 207 from the second measurement unit 205. The calculation unit 207 calculates an acquisition time taken to acquire the entire page from the Web server 100, based on the data amount of the entire page and the first available bandwidth. Furthermore, a value which is set based on a prediction in advance may be used as the first available bandwidth. For example, when the data amount of the entire page is 1 MByte and the first available bandwidth is 20 Mbps, it is possible for the calculation unit 207 to calculate the acquisition time Te to acquire the entire page as 400 ms from $(1 \times 1024 \times 1024 \times 8)/(20 \times 1024 \times 1024)$.

In addition, the compressed data amount of the image of the first region is input into the calculation unit 207 from the compression unit 209. The calculation unit 207 calculates a transmission time taken to transmit the image of the first region to the client terminal 300, based on the compressed data amount of the image of the first region and the second available bandwidth. Furthermore, a value which is set based on a prediction in advance may be used as the compressed data amount of the image of the first region. For example, when the GW server 200 and the client terminal 300 are first connected, or the like, it is possible to set the preset average compressed data amount as the compressed data amount of the image of the first region. For example, when the compressed data amount of the image of the first region is 100 KBytes and the first available bandwidth is 7 Mbps, it is possible for the calculation unit 207 to calculate the transmission time of the image of the first region as 112 ms from $(100 \times 1024 \times 8)/(7 \times 1024 \times 1024)$. Furthermore, the calculation unit 207 may use a preset prediction value regarding the first available bandwidth. In addition, the calculation unit 207 may calculate the transmission time of the image of the first region as the preset value, based on the compressed data amount of the image of the first region and the first available bandwidth which have been predicted.

The calculation unit 207 calculates a time difference between the acquisition time Te to acquire the entire page and the transmission time of the image of the first region. For example, in the example described above, it is possible for the calculation unit 207 to calculate 288 ms as the time difference from 400-112. The calculation unit 207 calculates the data amount transmittable to the client terminal 300 during the time difference, based on the time difference and the second available bandwidth. For example, in the example described above, it is possible for the calculation unit 207 to calculate 258 KBytes from $(0.288 \times 7 \times 1024 \times 1024)/8/1024$ as the transmittable data amount during the time difference.

The calculation unit 207 calculates the number of partition regions transmitted to the client terminal 300 during the time difference, based on the compressed data amount of one partition region of a predetermined value set in advance and the transmittable data amount during the time difference. For example, when the compressed data amount of one partition region is 90 KBytes, in the example described above, it is possible for the calculation unit 207 to calculate the number of partition regions transmitted to the client terminal 300 during the time difference as 2 from 258/90. The calculation unit 207 outputs the compressed data amount of one partition region and the calculated number of the transmitted partition regions to the partition unit 208. Furthermore, the predetermined value of the compressed data amount of one partition region set in advance may be, for example, 50 KBytes, 100 KBytes or the like, based on the average value or the like obtained by gathering statistics about the data amount transmitted to the client terminal 300, for example.

In addition, it is possible for the calculation unit 207 to use, for example, the data amount corresponding to the scroll amount based on the number of times a single flicking operation is performed on the touch panel by the user, for the compressed data amount of one partition region. For example, the scroll amount is determined by calculating the most frequent value or the like in advance, based on a statistical value of the scroll amount produced by the flicking operation in the client terminal 300.

In addition, the calculation unit 207 may use a value which is gradually updated by the operation of the user for the scroll amount. In this case, the calculation unit 207 is supplied with the operational information from the second communication unit 204, and extracts the scroll amount from the operational information. The calculation unit 207 calculates the corresponding compressed data amount, based on the extracted scroll amount. The calculation unit 207 calculates, for example, the corresponding compressed data amount, based on the extracted scroll amount and the average compression ratio. The calculation unit 207 sets the calculated corresponding compressed data amount as the compressed data amount of one partition region, and calculates the number of partition regions transmitted to the client terminal 300 during the time difference, based on the compressed data amount of one partition region and the transmittable data amount during the time difference. As described above, by using the updated scroll amount, it is possible to change the compressed data amount of one partition region which is a criterion for calculating the number of partition regions of the second region in accordance with the operation of the user.

In addition, the calculation unit 207 may define the number of partition regions transmitted to the client terminal 300 during the time difference as the number of pixels of the partition regions. In this case, the calculation unit 207 determines the number of pixels of the partition regions in advance, or determines the number of pixels in a scroll direction, based on the scroll amount described above. The calculation unit 207 outputs the number of pixels of the partition regions which is predetermined or determined to the partition unit 208. It is possible to set the number of pixels of the partition regions as, for example, a half of the display region of the browser, and, for example, when the number of pixels in the scroll direction of the display region is 600 pixels, it is possible to set 300 pixels. That is, the second region may be partitioned into the partition regions according to an area of the second region.

The partition unit 208 reads out the image of the entire page from the frame buffer 210, and partitions the image into the first region and the second region. In addition, the compressed data amount of one partition region or the number of pixels, and the calculated number of the transmitted partition regions are input into the partition unit 208 from the calculation unit 207. The partition unit 208 partitions the second region into one or more partition regions, based on the compressed data amount of one partition region or the number of pixels which are input. The partition unit 208 determines whether or not the image corresponding to the first region is updated, and creates differential image data when the image is updated. In addition, the partition unit 208 determines whether or not the images corresponding to the partition regions of the transmitted number are updated, and creates differential image data when the images are updated. The partition unit 208 outputs the differential image data of the image corresponding to the first region to the compression unit 209. In addition, the partition unit 208 sequentially outputs the differential image data of the images corresponding to the partition regions of the transmitted number adjacent to the first region to the compression unit 209. Furthermore, when the number of pixels in the scroll direction of the second region does not satisfy the number of pixels based on the compressed data amount of one partition region, or the input number of pixels, it is possible to set the second region as one region without partitioning, that is, to set the number of partition regions as 1.

When supplied with the differential image data of the image corresponding to the first region and the images corresponding to the partition regions from the partition unit 208, the compression unit 209 compresses the differential image data of the respective images. The compression unit 209 uses, for example, JPEG in case of a still image, and a MPEG-2, a MPEG-4, or the like in case of a dynamic image as a codec for the compression. The compression unit 209 outputs the compressed differential image data to the second communication unit 204 as the compressed data (an update difference). In addition, the compression unit 209 outputs the data amount of the compressed data of the image corresponding to the first region to the calculation unit 207 as the compressed data amount of the image of the first region.

The frame buffer 210 is a storage device which stores the bit map image which is the image corresponding to the entire page drawn by the creation unit 206. As one aspect of the frame buffer 210, a semiconductor memory element such as a Random Access Memory (RAM), a Read Only Memory (ROM), a flash memory, and the like in addition to a Video Random Access Memory (VRAM) are included. Furthermore, the frame buffer 210 may adopt a storage device such as a hard disk, an optical disc, or the like.

(Configuration of Client Terminal)

Next, a functional configuration of the client terminal according to this embodiment will be described. As illustrated in FIG. 1, the client terminal 300 includes an input unit 301, a communication unit 302, a restoration unit 303, a display buffer 304, and a display unit 305. Furthermore, in the example of FIG. 1, various functional units of the well-known computer, for example, units having functions of an audio output unit, and the like are included, in addition to the functional units illustrated in FIG. 1.

The input unit 301 is an input device which receives various operations from the user. For example, the input unit 301 is realized by a touch panel, a mouse, a keyboard, or the like. In addition, when the touch panel is used, the input unit 301 is integrated with the display unit 305 which is a display device. The input unit 301 outputs the operational information according to the operation of the user to the communication unit 302.

The communication unit 302 is realized, for example, by a NIC or the like, and includes a transmission unit and a reception unit. The communication unit 302 is connected to the GW server 200 through a network in a wired or a wireless manner, and is a communication interface controlling the communication of the information between the GW server 200 and the communication unit 302. The communication unit 302 transmits the operational information input from the input unit 301 to the GW server 200 through the network. In addition, when receiving the compressed data from the GW server 200, the communication unit 302 outputs the compressed data with respect to the restoration unit 303.

The restoration unit 303 restores the compressed data input from the communication unit 302. The restoration unit 303 restores the differential image data of the image corresponding to the first region and the images corresponding to the partition regions from the compressed data to store in the display buffer 304. The restoration unit 303 creates image data which is newly displayed by updating the image data stored in the display buffer 304, that is, the image data of the image which is currently displayed with the differential image data, and stores the created image data in the display buffer 304. Furthermore, the restoration of the restoration unit 303 is performed by the codec used in the compression of the compression unit 209 in the GW server 200.

The display buffer 304 stores the image corresponding to the entire page. That is, the display buffer 304 stores the image corresponding to the first region and the images corresponding to the partition regions.

The display unit 305 is a display device for displaying various information items, and is realized, for example, by a liquid crystal display or the like. In addition, when a touch panel is used as the input unit 301, the display unit 305 is integrated with the input unit 301. The display unit 305 reads out the image data which is displayed on the display screen from the display buffer 304, and displays the image data.

Next, the performance of the thin client system according to this embodiment will be described.

Figure 2:
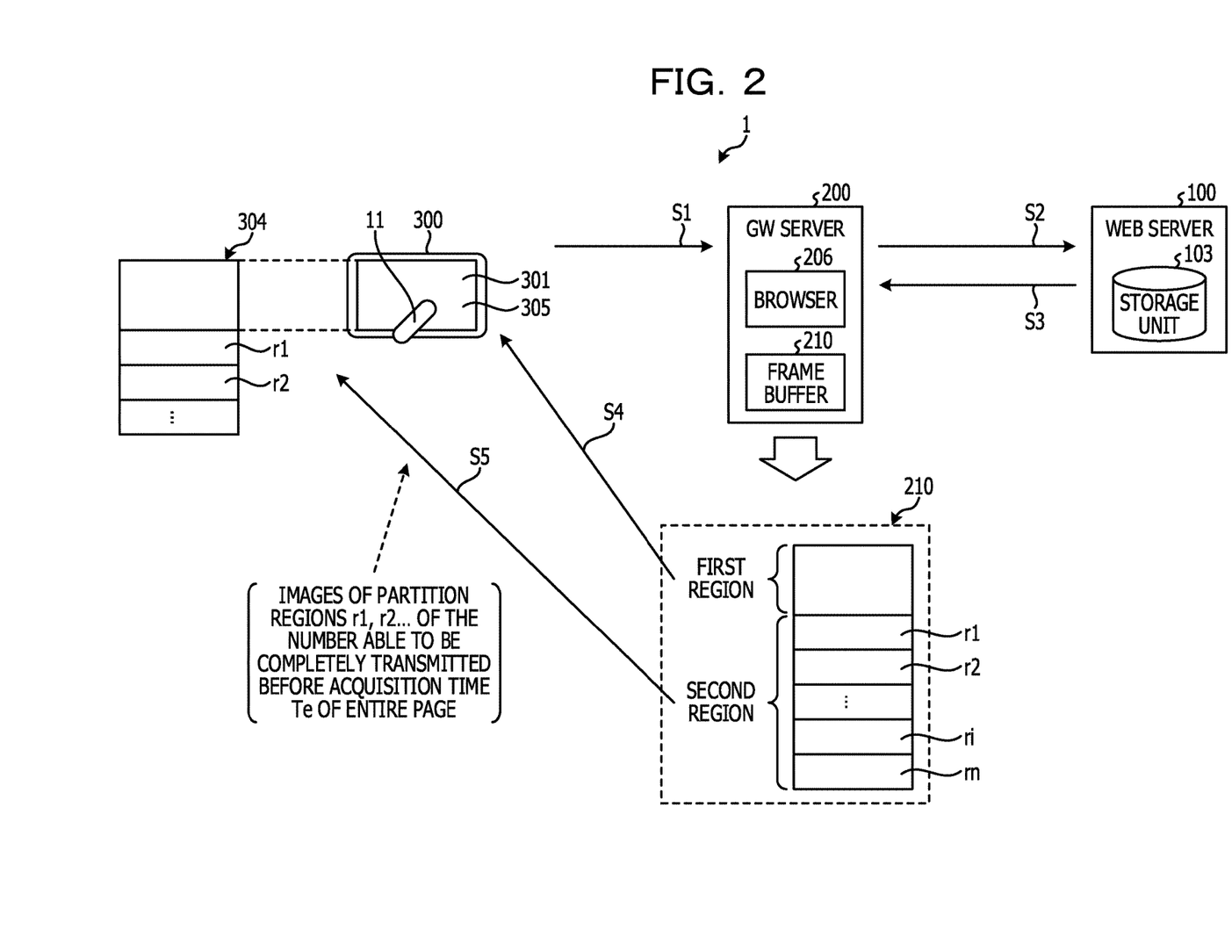
FIG. 2 is an explanatory diagram illustrating an outline of the performance of the thin client system according to the embodiment.

First, an outline of the performance of the thin client system according to this embodiment will be described by using FIG. 2. FIG. 2 is an explanatory diagram illustrating an outline of the performance of the thin client system according to the embodiment. The user browses a Web page stored in the Web server 100 by using the client terminal 300. At this time, the GW server 200 is actually accessing the Web server 100. Receiving the image of the page created by the browser (the creation unit) 206 of the GW server 200 causes the client terminal 300 to function as if it is accessing the Web server 100.

First, the user, for example, taps a certain link on the screen of the browser displayed on the display unit 305 of the client terminal 300 by using a finger 11. When supplied with the tapping operation from the input unit 301, the client terminal 300 transmits the tapping operation to the GW server 200 as the operational information (Step S1).

When the GW server 200 receives the operational information, the operational information is input into the browser 206 by the OS execution control unit 201. The browser 206 performs a page request with respect to the Web server 100, based on the operational information (Step S2). The Web server 100 reads out the corresponding page from the storage unit 103 and transmits the page to the GW server 200 according to the page request (Step S3).

When the GW server 200 receives the page from the Web server 100, the browser 206 draws the page to store in the frame buffer 210. The GW server 200 transmits the image of the first region of the page to be displayed by the client terminal 300 to the client terminal 300 (Step S4). When receiving the image of the first region, the client terminal 300 stores the image in the display buffer 304 and displays the image on the display unit 305.

Subsequently, the GW server 200 partitions the second region other than the first region of the page and sequentially transmits the partition regions adjacent to the first region to the client terminal 300 (Step S5). Here, the GW server 200 partitions the region into, for example, n-regions according to the compressed data amount of one partition region. In addition, the GW server 200 calculates the time difference Te−T1 between the acquisition time Te to acquire the entire page from the Web server 100 and the transmission time T1 to transmit the image of the first region to the client terminal 300. The GW server 200 calculates the number of partition regions transmittable to the client terminal 300 during the time difference Te−T1. For example, when the number of transmittable partition regions is 2, the GW server 200 transmits the partition regions r1, r2 to the client terminal 300 during the time difference Te−T1.

When receiving the partition regions r1, r2, the client terminal 300 stores the regions in the display buffer 304. Here, when supplied with the flicking operation by the finger 11 of the user from the input unit 301, the client terminal 300 transmits the operation to the GW server 200 as the operational information. In addition, the client terminal 300 displays the partition regions r1, r2 stored in the display buffer 304 on the display unit 305 according to the flicking operation. Furthermore, when supplied with new operational information from the client terminal 300, the GW server 200 may transmit the remaining partition regions to the client terminal 300 in sequence.

As described above, in the thin client system 1, the GW server 200 transmits a portion of the page other than the first region to the client terminal 300 during the time difference between the acquisition time taken to acquire the entire page and the transmission time taken to transmit the first region displayed by the client terminal 300. Accordingly, it is possible to improve the response with respect to the scrolling operation in the client terminal 300.

Figure 3:
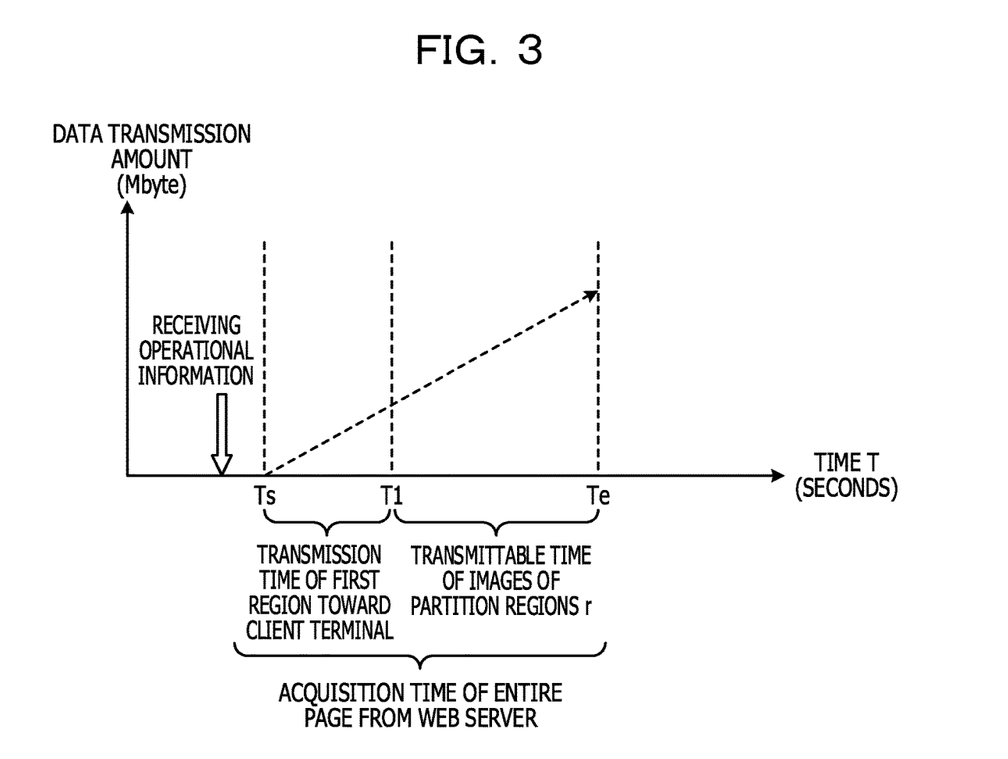
FIG. 3 is an explanatory diagram illustrating an example of the relationship between acquisition time of an entire page and transmission time of a first region.

Here, the relationship between the acquisition time Te for the GW server 200 to acquire the entire page from the Web server 100 and the transmission time of the first region and the partition regions toward the client terminal 300 from the GW server 200 will be described, by using FIG. 3. FIG. 3 is an explanatory diagram illustrating an example of the relationship between the acquisition time of the entire page and the transmission time of a first region. When receiving the operational information from the client terminal 300, the GW server 200 transmits a page request with respect to the Web server 100. The Web server 100 begins the transmission of the page with respect to the GW server 200. Here, in the HTML of the page, the data amount of the entire page is described. In addition, a time for the GW server 200 to begin the reception of the page is set as Ts, the acquisition time taken to acquire the entire page is set as Te, and the transmission time taken to transmit the first region to the client terminal 300 is set as T1. At this time, as illustrated in FIG. 3, the GW server 200 begins the reception of the page and the transmission of the first region from the time of Ts, and completes the transmission of the first region at the time of T1. Since a time difference (Te−T1) exists before the acquisition time Te, the GW server 200 uses the time difference (Te−T1) to transmit the images of the partition regions r to the client terminal 300.

Figure 4:
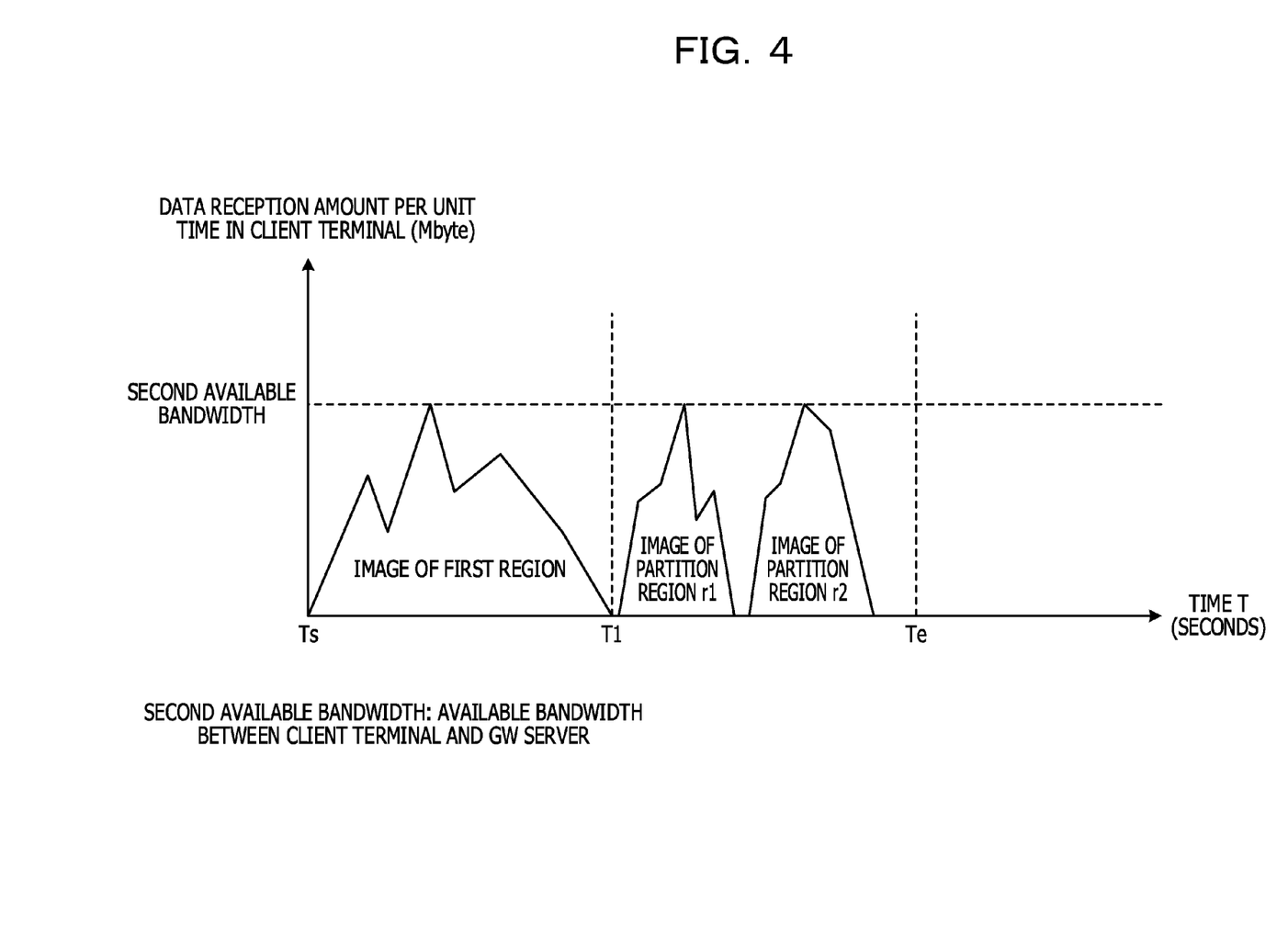
FIG. 4 is an explanatory diagram illustrating an example of the relationship between a second available bandwidth and images of partition regions transmitted before the acquisition time of the entire page.

FIG. 4 is an explanatory diagram illustrating an example of the relationship between a second available bandwidth and images of partition regions transmitted before the acquisition time of the entire page. The number of images of the partition regions r transmittable to the client terminal 300 from the GW server 200, is calculated based on the time difference (Te−T1) and the second available bandwidth. As illustrated in FIG. 4, the GW server 200 transmits the image of the first region in the range of the second available bandwidth, then transmits the images of the partition regions r1, r2, . . . , rn in the range of the second available bandwidth from the transmission time T1 in which the transmission of the image of the first region is completed. In the example of FIG. 4, the GW server 200 transmits the partition regions r1 and r2 to the client terminal 300 during the time difference (Te−T1). Furthermore, each of the images is transmitted as the compressed data.

Figure 5:
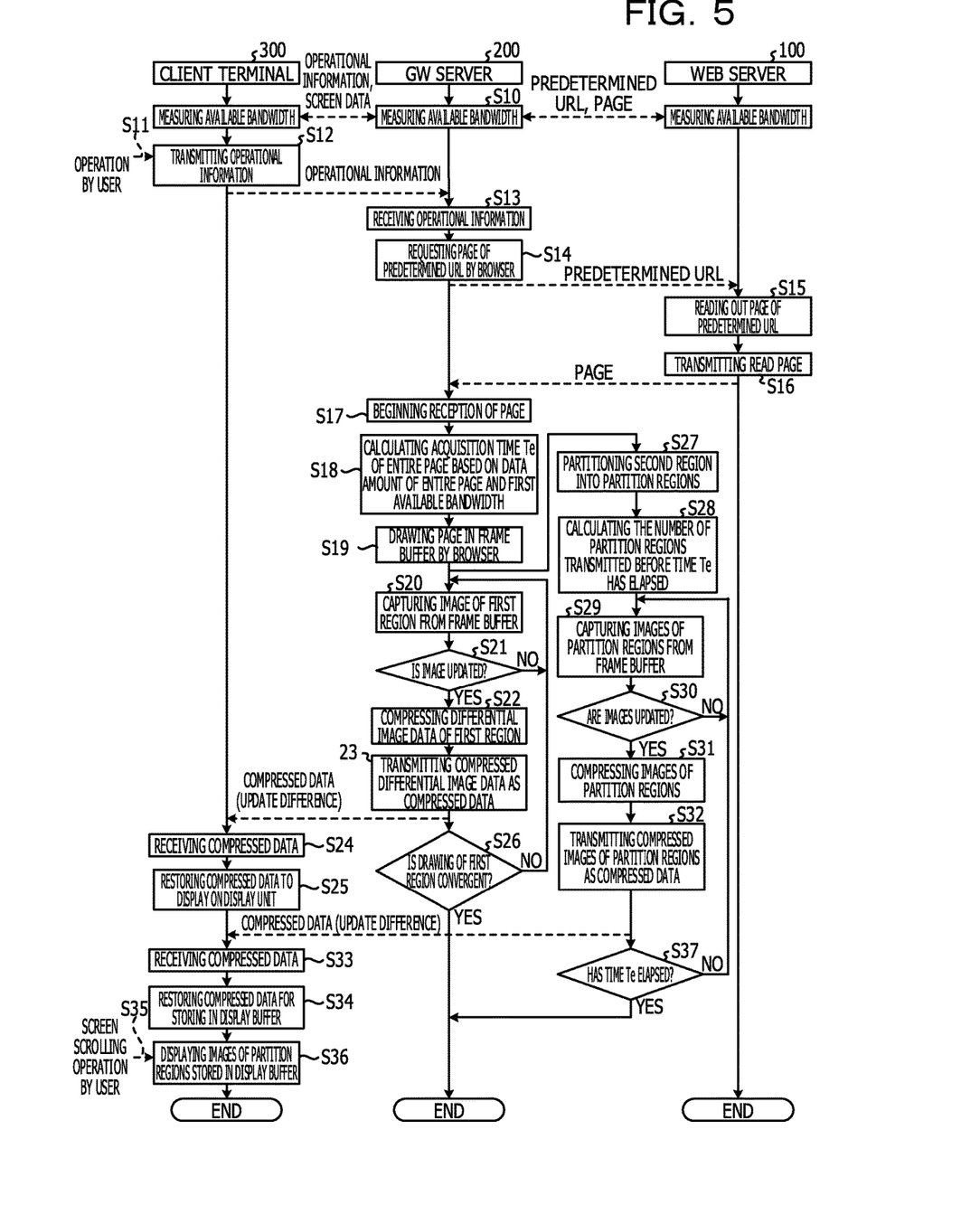
FIG. 5 is a sequence diagram illustrating an example of the performance of the thin client system according to the embodiment.

Subsequently, a sequence of the performance of the thin client system 1 according to this embodiment will be described by using FIG. 5. FIG. 5 is a sequence diagram illustrating an example of the performance of the thin client system according to the embodiment.

As an initial setting of the thin client system 1, the size of the partition region in the GW server 200, that is, the compressed data amount of one partition region is set as a predetermined value in advance. First, the Web server 100, the GW server 200, and the client terminal 300 of the thin client system 1 measure the available bandwidth by using the data or the like transmitted and received therebetween. When the GW server 200 is described as an example, a predetermined URL or the data of the page which is the page request is transmitted and received between the GW server 200 and the Web server 100. The first measurement unit 203 of the GW server 200 measures the data which is transmitted and received with respect to the first communication unit 202, that is, measures the first available bandwidth which is the usable bandwidth. In addition, the operational information, the screen data, or the like is transmitted and received between the GW server 200 and the client terminal 300. The second measurement unit 205 of the GW server 200 measures the data which is transmitted and received with respect to the second communication unit 204, that is, measures the second available bandwidth which is the usable bandwidth (Step S10). The first available bandwidth and the second available bandwidth which are measured are input into the calculation unit 207. Furthermore, in order to measure the available bandwidth, the available bandwidths in the Web server 100 and the client terminal 300 may be measured, respectively, and the measured available bandwidth may be transmitted to the GW server 200.

Then, in the client terminal 300, the user performs an operation (Step S11). The operation of the user is, for example, tapping a certain link, for example, on the screen of the browser displayed on the display unit 305 of the client terminal 300. When supplied with the tapping operation from the input unit 301, the client terminal 300 transmits the tapping operation to the GW server 200 as the operational information (Step S12).

Then the GW server 200 receives the operational information (Step S13), and the operational information is input into the browser 206 by the OS execution control unit 201. The browser 206 requests a page of a predetermined URL with respect to the Web server 100, based on the operational information (Step S14). When receiving the predetermined URL as the page request, the Web server 100 reads out the page of the predetermined URL from the storage unit 103 (Step S15). The Web server 100 transmits the read page to the GW server 200 (Step S16).

The first communication unit 202 of the GW server 200 begins the reception of the page from the Web server 100 (Step S17). The first communication unit 202 outputs the page to the creation unit 206, and extracts the data amount of the entire page described in the HTML of the page to output to the calculation unit 207. The calculation unit 207 calculates the acquisition time Te to acquire the entire page from the Web server 100, based on the data amount of the entire page and the first available bandwidth (Step S18). The creation unit 206 draws the page input from the first communication unit 202 in the frame buffer 210, and creates an image for displaying the page on the display screen (Step S19).

The partition unit 208 reads out the image of the entire page from the frame buffer 210, partitions the image into the first region and the second region, and captures the image of the first region, thereby acquiring the image (Step S20). The partition unit 208 determines whether or not the acquired image of the first region is updated with respect to the image of the first region acquired at the previous time (Step S21). When the acquired image of the first region is not updated with respect to the image of the first region acquired at the previous time (Step S21: No), the partition unit 208 returns to Step S20, and continues to capture the image of the first region at a predetermined interval, for example, an interval of 5 times in one second. When the acquired image of the first region is updated with respect to the image of the first region acquired at the previous time (Step S21: Yes), the partition unit 208 creates differential image data between the image of the first region acquired at the previous time and the image of the first region acquired at the current time, and outputs the differential image data to the compression unit 209. The compression unit 209 compresses the input differential image data of the first region, and outputs the compressed data to the second communication unit 204 (Step S22). In addition, the compression unit 209 outputs the data amount of the compressed data of the image of the first region to the calculation unit 207.

The second communication unit 204 transmits the compressed differential image data to the client terminal 300 as the compressed data (Step S23). When receiving the compressed data from the GW server 200, the communication unit 302 of the client terminal 300 outputs the compressed data with respect to the restoration unit 303 (Step S24). The restoration unit 303 creates image data of a portion to be updated by restoring the differential image data of the image corresponding to the first region from the compressed data, and updates the image stored in the display buffer 304. The display unit 305 reads out the image data to be displayed on the display screen from the display buffer 304 and displays the image data (Step S25).

The partition unit 208 of the GW server 200 determines whether or not the drawing of the first region is convergent (Step S26). When the drawing of the first region is not convergent (Step S26: No), the partition unit 208 returns to Step S20, and repeats Steps S20 to S23. That is, the partition unit 208 continues to capture the image of the first region at a predetermined interval, until the drawing of the first region is convergent, and transmits the differential image data to the client terminal 300. When the drawing of the first region is convergent (Step S26: Yes), the partition unit 208 ends the update process of the first region.

The partition unit 208 performs the processes with respect to the second region, along with the processes of Steps S20 to S26 with respect to the first region. The partition unit 208 partitions the second region into one or more partition regions, based on the compressed data amount of one partition region of a predetermined value set in advance (Step S27). The calculation unit 207 calculates the transmission time T1 in which the image of the first region is transmitted to the client terminal 300, based on the compressed data amount of the image of the first region and the second available bandwidth. In addition, the calculation unit 207 calculates the time difference between the acquisition time Te to acquire the entire page and the transmission time T1 of the image of the first region. The calculation unit 207 calculates the data amount transmittable to the client terminal 300 during the time difference, based on the time difference and the second available bandwidth. The calculation unit 207 calculates the number of partition regions transmitted to the client terminal 300 during the time difference, based on the compressed data amount of one partition region and the data amount transmittable during the time difference (Step S28).

When supplied with the number of partition regions transmitted to the client terminal 300 during the time difference from calculation unit 207, the partition unit 208 sequentially captures the images corresponding to the partition regions adjacent to the first region, thereby acquiring the image (Step S29). The partition unit 208 determines whether or not the acquired images of the partition regions are updated with respect to the images of the partition regions acquired at the previous time (Step S30). When the acquired images of the partition regions are not updated with respect to the images of the partition regions acquired at the previous time (Step S30: No), the partition unit 208 returns to Step S29, and continues to capture the images of the partition regions at a predetermined interval, for example, at an interval of 5 times in one second. When the acquired images of the partition regions are updated with respect to the images of the partition regions acquired at the previous time (Step S30: Yes), the partition unit 208 creates differential image data between the images of the partition regions acquired at the previous time and the images of the partition regions acquired at the current time, and outputs the differential image data to the compression unit 209. The compression unit 209 compresses the input differential image data of the partition regions, and outputs the compressed data to the second communication unit 204 (Step S31).

The second communication unit 204 transmits the compressed differential image data to the client terminal 300 as the compressed data (Step S32). When receiving the compressed data from the GW server 200, the communication unit 302 of the client terminal 300 outputs the compressed data with respect to the restoration unit 303 (Step S33). The restoration unit 303 creates image data of a portion to be updated by restoring the differential image data of the images corresponding to the partition regions from the compressed data, and updates the image data stored in the display buffer 304 (Step S34).

When supplied with the flicking operation for scrolling the screen by the user (Step S35), the client terminal 300 transmits the operational information of the flicking operation to the GW server 200. In addition, the client terminal 300 transmits the operational information, reads out the images of the partition regions to be displayed on the display screen by the display unit 305 from the display buffer 304, and displays the images (Step S36).

The partition unit 208 of the GW server 200 determines whether or not the acquisition time Te of the entire page has elapsed (Step S37). When the acquisition time Te of the entire page has not elapsed (Step S37: No), the partition unit 208 returns to Step S29, and repeats Steps S29 to S32. That is, the partition unit 208 continues to capture the images of the partition regions at a predetermined interval before the acquisition time Te of the entire page has elapsed, and sequentially transmits the differential image data of the partition regions adjacent to the first region to the client terminal 300. When the acquisition time Te of the entire page has elapsed (Step S37: Yes), the partition unit 208 ends the update process of the partition region, that is, the second region.

As described above, the GW server 200 which is a relay device receives a page from the Web server 100 which is a server device, and partitions the second region other than the first region of the page in which the page is displayed by the client terminal 300 into one or more partition regions. In addition, the GW server 200 calculates the number of partition regions transmitted to the client terminal 300 during the time difference between the acquisition time taken to acquire the entire page from the Web server 100 and the transmission time taken to transmit the first region to the client terminal 300. In addition, the GW server 200 transmits the image corresponding to the first region and the images corresponding to the partition regions of the calculated number to the client terminal 300. As a result, it is possible to improve the response with respect to the scrolling operation.

In addition, the GW server 200 further creates an image corresponding to the first region and an image corresponding to the second region, based on the page, and stores the images corresponding to the first region and the second region in the frame buffer 210. In addition, the GW server 200 measures the first available bandwidth which is the usable bandwidth of the first communication unit 202 and measures the second available bandwidth which is the usable bandwidth of the second communication unit 204. In addition, the GW server 200 calculates the acquisition time taken to acquire the entire page, based on the data amount of the entire page and the first available bandwidth, and calculates the transmission time, based on the image corresponding to the first region and the second available bandwidth. In addition, the GW server 200 calculates the time difference, based on the acquisition time and the transmission time which are calculated, and calculates the number of partition regions transmitted to the client terminal 300 during the time difference, based on the calculated time difference and the second available bandwidth. As a result, it is possible to transmit the partition regions having the number according to the available bandwidth between the Web server 100 and the client terminal 300 to the client terminal 300.

In addition, the GW server 200 partitions the second region into one or more partition regions, based on the scroll amount determined in advance according to a statistical value of the scroll amount in the client terminal 300. As a result, even in various types of client terminals 300 in which the sizes of the screen are different from each other, it is possible to improve the response with respect to the scrolling operation according to each of the screens.

In addition, the GW server 200 sequentially transmits the images corresponding to the partition regions adjacent to the image corresponding to the first region. As a result, even if the operational information of the flicking operation which scrolls the screen is input from the client terminal 300 before the acquisition time of the entire page has elapsed, it is possible to improve the response with respect to the scrolling operation for the partition regions which are previously transmitted.

In addition, in the above described embodiment, the GW server 200 performs the processes with respect to the first region and the second region in parallel, but the embodiment is not limited thereto. The GW server 200 may end, for example, the processes with respect to the first region, and perform the processes with respect to the second region after completing the transmission of the compressed data to the client terminal 300. As a result, it is possible to reduce the load of the process to capture the image in the partition unit 208.

In addition, in the above described embodiment, the number of partition regions transmitted with respect to the client terminal 300 from the GW server 200 during the time difference is calculated from the data amount of the entire page, the first available bandwidth, the data amount of the image of the first region, and the second available bandwidth which are actually measured, but the embodiment is not limited thereto. When it is possible to predict, for example, the quality of each communication wiring and each data amount, the GW server 200 may calculate the number of partition regions transmitted during the time difference, based on the predicted values in advance. As a result, it is possible to omit the first measurement unit 203 and the second measurement unit 205, and to reduce the load of the calculation unit 207.

In addition, in the above described embodiment, the Web page in which the HTML is used as the content is illustrated, but the embodiment is not limited thereto. The content may be other content such as a map, a Portable Document Format (PDF) file, or the like, insofar as it is possible to determine the acquisition time of the entire content at the time of beginning the access.

In addition, the respective configuration elements of the respective units which are illustrated may not be configured to be physically the same as those illustrated in the drawings. That is, the specific form of the dispersion and unification of the respective units is not limited to those illustrated in the drawings, and it is possible to configure the entire units or a portion of the units by functionally or physically dispersing and unifying in an arbitrary unit according to various loads or usage conditions. For example, the calculation unit 207 calculates the number of partition regions transmitted to the client terminal 300 during the time difference and the compressed data amount of one partition region which is the criterion amount for calculating the number of partition regions, but it is possible to partition the calculation unit 207 into two calculation units.

Further, the entire functions or any portion of the functions of the various processing functions performed by the respective devices may be performed on a Central Processing Unit (CPU) (or a micro computer such as a Micro Processing Unit (MPU), a Micro Controller Unit (MCU), or the like). In addition, the entire functions or any portion of the functions of the various processing functions may be also performed on a program analyzed and executed by a CPU (or a micro computer such as a MPU, a MCU or the like), or on hardware by wired logic.

Figure 6:
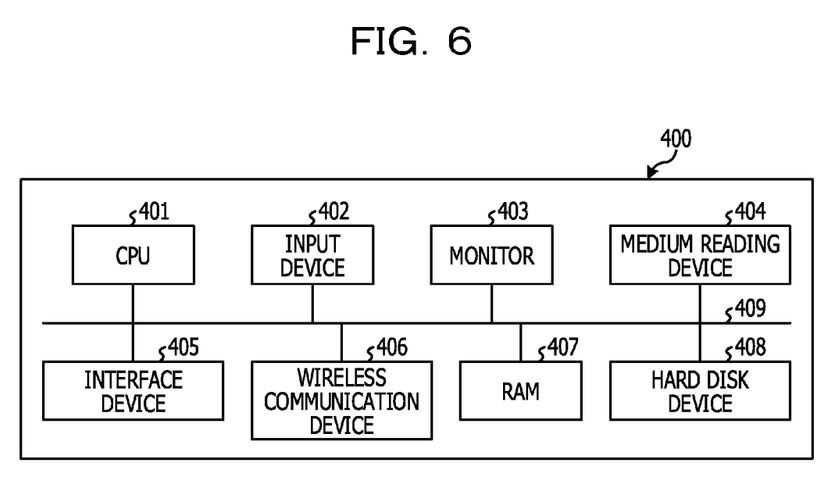
FIG. 6 is an explanatory diagram illustrating an example of a computer executing a relay program.

In the meantime, it is possible to realize the various processes described in the above described embodiment by executing a previously prepared program on a computer. Accordingly, hereinafter, an example of the computer executing the program which has the same functions as those of the above described embodiment will be described. FIG. 6 is an explanatory diagram illustrating an example of a computer executing a relay program.

As illustrated in FIG. 6, the computer 400 includes a CPU 401 which performs various arithmetic processes, an input device 402 into which the data is input by the user, and a monitor 403. In addition, the computer 400 includes a medium reading device 404 which reads out programs or the like from the storage medium, an interface device 405 to connect with other devices, and a wireless communication device 406 to connect with the other devices in a wireless manner. In addition, the computer 400 includes a RAM 407 which temporally stores various information items, and a hard disk device 408. In addition, the respective devices 401 to 408 are connected to a bus 409.

In the hard disk device 408, an information processing program which has the same functions as those of the respective processing units of the calculation unit 207 and the partition unit 208 illustrated in FIG. 1 is stored. In addition, in the hard disk device 408, various data items for executing the information processing program are stored. The interface device 405 and the wireless communication device 406 have the same functions as those of the first communication unit 202 and the second communication unit 204 illustrated in FIG. 1.

The CPU 401 performs various processes by reading out respective programs stored in the hard disk device 408, opening the programs in the RAM 407, and executing the programs. In addition, it is possible for these programs to cause the computer 400 to function as the calculation unit 207 and the partition unit 208 illustrated in FIG. 1.

Furthermore, the above described information processing program may not be stored in the hard disk device 408. For example, the computer 400 may read out the programs stored in a storage medium which is readable by the computer 400, and execute the programs. The storage medium which is readable by the computer 400 corresponds to, for example, a transportable storage medium such as a CD-ROM, a DVD disc, an Universal Serial Bus (USB) memory, or the like, a semiconductor memory such as a flash memory, or the like, a hard disk drive, or the like. In addition, the information processing program may be stored in a device connected to a public line, the Internet, a Local Area Network (LAN), or the like, and the computer 400 may read out the information processing program from the device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
a processor; and
at least one memory which stores instructions, which when executed by the processor, cause the following to be performed by the relay device:
receiving, from a server device, a page to be displayed on a client terminal;
partitioning the received page into a first region for which a corresponding image is to be initially displayed on the client terminal, and a second region that is outside of the first region;
partitioning the second region into partition regions;
calculating a number of the partition regions transmittable to the client terminal during a time difference between an acquisition time to acquire the entire page by the relay device from the server device and a transmission time to transmit the image corresponding to the first region by the relay device to the client terminal;
transmitting the image corresponding to the first region to the client terminal; and
after transmitting the image corresponding to the first region of the received page to the client terminal, and before elapse of the time difference, transmitting images corresponding to the calculated number of the partition regions of the second region of the received page to the client terminal.

2. The relay device according to claim 1, wherein the instructions, when executed by the processor, cause the following to be further performed by the relay device:
creating the image corresponding to the first region and an image corresponding to the second region, based on the received page;
storing the image corresponding to the first region and the image corresponding to the second region in a frame buffer;
measuring a first available bandwidth which is a usable bandwidth in the receiving;
measuring a second available bandwidth which is a usable bandwidth in the transmitting the image corresponding to the first region and the transmitting the images corresponding to the calculated number of the partition regions;
calculating the acquisition time based on a data amount of the entire page and the measured first available bandwidth;
calculating the transmission time based on the image corresponding to the first region and the measured second available bandwidth; and
calculating the time difference based on the calculated acquisition time and the calculated transmission time; and
the calculating the number of the partition regions calculates the number of the partition regions based on the calculated time difference and the measured second available bandwidth.

3. The relay device according to claim 1, wherein the partitioning the second region partitions the second region into the partition regions based on a scroll amount determined in advance according to a statistical value of the scroll amount in the client terminal.

4. The relay device according to claim 1, wherein the transmitting images corresponding to the calculated number of the partition regions to the client terminal transmits the images sequentially starting with an image corresponding to a respective partition region adjacent to the first region.

5. A relay method comprising:
executing instructions stored in at least one memory by a processor included in a relay device to cause the following to be performed by the relay device:
- receiving, from a server device, a page to be displayed on a client terminal;
- partitioning the received page into a first region for which a corresponding image is to be initially displayed on the client terminal, and a second region that is outside of the first region;
- partitioning the second region into partition regions;
- calculating a number of the partition regions transmittable to the client terminal during a time difference between an acquisition time to acquire the entire page by the relay device from the server device and a transmission time to transmit the image corresponding to the first region by the relay device to the client terminal;
- transmitting the image corresponding to the first region to the client terminal; and
- after transmitting the image corresponding to the first region of the received page to the client terminal, and before elapse of the time difference, transmitting images corresponding to the calculated number of the partition regions of the second region of the received page to the client terminal.

6. The relay method according to claim 5, further comprising:
executing the instructions stored in the at least one memory by the processor included in the relay device to cause the following to be further performed:
- creating the image corresponding to the first region and an image corresponding to the second region, based on the received page;
- storing the image corresponding to the first region and the image corresponding to the second region in a frame buffer;
- measuring a first available bandwidth which is a usable bandwidth in the receiving;
- measuring a second available bandwidth which is a usable bandwidth in the transmitting the image corresponding to the first region and the transmitting the images corresponding to the calculated number of the partition regions;
- calculating the acquisition time based on a data amount of the entire page and the measured first available bandwidth;
- calculating the transmission time based on the image corresponding to the first region and the measured second available bandwidth; and
- calculating the time difference based on the calculated acquisition time and the calculated transmission time,
wherein the calculating the number of the partition regions calculates the number of the partition regions based on the calculated time difference and the measured second available bandwidth.

7. The relay method according to claim 5,
wherein the partitioning the second region partitions the second region into partition regions based on a scroll amount determined in advance according to a statistical value of the scroll amount in the client terminal.

8. The relay method according to claim 5, wherein the transmitting images corresponding to the calculated number of the partition regions to the client terminal transmits the images sequentially starting with an image corresponding to a respective partition region adjacent to the first region.

9. A thin client system comprising:
a relay device; and
a client terminal,
wherein the relay device includes
a processor which executes instructions stored in at least one memory, to cause the following to be performed:
- receiving, from a server device, a page to be displayed on the client terminal,
- partitioning the received page into a first region for which a corresponding image is to be initially displayed on the client terminal, and a second region that is outside of the first region,
- partitioning the second region into partition regions,
- calculating a number of the partition regions transmittable to the client terminal during a time difference between an acquisition time to acquire the entire page by the relay device from the server device and a transmission time to transmit the image corresponding to the first region by the relay device to the client terminal,
- transmitting the image corresponding to the first region to the client terminal, and
- after transmitting the image corresponding to the first region of the received page to the client terminal, and before elapse of the calculated time difference, transmitting images corresponding to the calculated number of the partition regions of the second region of the received page to the client terminal, and
wherein the client terminal includes
a processor which executes instructions stored in at least one memory, to cause the following to be performed:
- inputting an operation of a user,
- receiving the image corresponding to the first region transmitted by the relay device and the images corresponding to the calculated number of the partition regions transmitted by the relay device,
- storing the received image corresponding to the first region and the received images corresponding to the calculated number of the partition regions in a display buffer, and
- displaying the image corresponding to the first region and the images corresponding to the calculated number of the partition regions which are stored in the display buffer, on the client terminal, according to a scrolling operation of the user.

* * * * *